US012767402B2

(12) United States Patent
Kim

(10) Patent No.: US 12,767,402 B2
(45) Date of Patent: Oct. 20, 2026

(54) CONTAINER LOCKING APPARATUS AND CONTAINER

(71) Applicant: Jum Gyu Kim, Seoul (KR)

(72) Inventor: Jum Gyu Kim, Seoul (KR)

( * ) Notice: Subject to any disclaimer, the term of this patent is extended or adjusted under 35 U.S.C. 154(b) by 11 days.

(21) Appl. No.: 18/991,344

(22) Filed: Dec. 20, 2024

(65) Prior Publication Data

US 2025/0333224 A1 Oct. 30, 2025

(30) Foreign Application Priority Data

Apr. 24, 2024 (KR) ........................ 10-2024-0054856

(51) Int. Cl.
*B65D 55/10* (2006.01)
*E05C 1/02* (2006.01)

(52) U.S. Cl.
CPC ................ *B65D 55/10* (2013.01); *E05C 1/02* (2013.01)

(58) Field of Classification Search
CPC ................ B65D 88/005; B65D 88/129; B65D 2519/00024; B65D 2519/00029; B65D 2519/00034; B65D 2519/00044; B65D 2519/00059; B65D 2519/00273; B65D 2519/00293; B65D 2519/00298; B65D 2519/00323; B65D 2519/00333; B65D 2519/00532; B65D 2519/00562; B65D 2519/00572; B65D 2519/00676; B65D 2519/0097; B65D 19/385
USPC .......................................................... 220/315
See application file for complete search history.

(56) References Cited

U.S. PATENT DOCUMENTS 3,459,326 A * 8/1969 Betjemann ........... B65D 88/005 217/43 R

FOREIGN PATENT DOCUMENTS

| | | | | |
|---|---|---|---|---|
| CN | 1252378 | * | 6/1999 | |
| CN | 108117003 A | | 6/2018 | |
| CN | 221879128 | * | 10/2023 | |
| KR | 20140133261 A | * | 5/2013 | ........... B65D 88/526 |
| KR | 10-2014-0133261 A | | 11/2014 | |

* cited by examiner

*Primary Examiner* — Orlando E Aviles
*Assistant Examiner* — Sanjidul Islam
(74) *Attorney, Agent, or Firm* — Bridgeway IP Law Group, PLLC; Sang Ho Lee; Hyun Woo Shin

(57) ABSTRACT

Provided are a container locking apparatus that allows easier insertion of a fixing pin while allowing more secure fixation; and a container. More particularly, the container locking apparatus includes at least one pinhole part formed at a portion of a container; and a fixing pin device formed at another portion of the container to correspond to the pinhole part, and slidably formed such that at least a portion of the fixing pin device can be inserted into the pinhole part to lock a portion of the container, wherein the pinhole part may include a regular trapezoidal pinhole part with an overall positive trapezoidal shape or an inverse trapezoidal pinhole part with an overall negative trapezoidal shape.

10 Claims, 8 Drawing Sheets

CONTAINER LOCKING APPARATUS AND CONTAINER

CROSS-REFERENCE TO RELATED APPLICATION

This application claims priority to Korean Patent Application No. 10-2024-0054856, filed on Apr. 24, 2024, in the Korean Intellectual Property Office, the disclosure of which is incorporated herein by reference.

BACKGROUND OF THE DISCLOSURE

Field of the Disclosure

The present disclosure relates to a container locking apparatus and a container, and more particularly to a container locking apparatus that allows easier insertion of a fixing pin while allowing more secure fixation; and a container.

Description of the Related Art

In general, a container is a box-shaped transport facility that is widely used as a cargo-loading container in the ship transportation field, has the capacity to load cargo inside, and is manufactured according to established standards so that it can be used in conjunction with one or more transportation methods.

These containers are stacked one after another on a container-only ship, enabling the mass transport of cargo, and are widely used as very useful equipment that serves as a unit of transport during loading or unloading operations.

SUMMARY OF THE DISCLOSURE

However, general containers, as well as containers whose side wall is folded on a bottom plate or whose height is adjusted by applying movable posts, can be installed with a locking apparatus for locking a folded side plate on a bottom plate or locking the height of movable posts, etc. However, when locking these joint parts, there are many problems in that it is very difficult for a fixing pin to be inserted into a pinhole due to the deviation between components, and even if a fixing pin is inserted into a pinhole, it is loosely inserted and shook, or cargos cannot be firmly supported.

Therefore, the present disclosure has been made in view of the above problems, and it is an object of the present disclosure to loosely guide a fixing pin to be easily inserted when it is initially inserted, thereby improving usability, and firmly fix the fixing pin to the pinhole part when it is fully inserted, thereby greatly improving the fixing force. However, these objectives are exemplary and the scope of the present disclosure is not limited thereto.

In accordance with an aspect of the present disclosure, the above and other objects can be accomplished by the provision of a container locking apparatus, including: at least one pinhole part formed at a portion of a container; and a fixing pin device formed at another portion of the container to correspond to the pinhole part, and slidably formed such that at least a portion of the fixing pin device can be inserted into the pinhole part to lock a portion of the container, wherein the pinhole part includes a regular trapezoidal pinhole part with an overall positive trapezoidal shape or an inverse trapezoidal pinhole part with an overall negative trapezoidal shape which guides the fixing pin device to be easily inserted when insertion of the fixing pin device begins, and makes the fixing pin device to firmly fix the pinhole part when insertion of the fixing pin device is completed.

In accordance with the present disclosure, the pinhole part may be two or more, and the plural pinhole parts may be formed on side surfaces of movable posts adjusted in height by expanding and contracting from a side wall of the container, and the fixing pin device may be formed on the side wall of the container to be inserted into one of the pinhole parts formed at the movable posts, thereby locking the movable posts.

In accordance with the present disclosure, the pinhole part may be a regular trapezoidal pinhole part, and a first through-hole part formed at the side wall of the container may be an inverted trapezoidal through-hole part.

In accordance with the present disclosure, the pinhole part may be an inverse trapezoidal pinhole part, and the first through-hole part formed at the side wall of the container may be an inverted trapezoidal through-hole part.

In accordance with the present disclosure, the at least one pinhole part may be formed on a side wall that is rotated about a hinge axis to be expanded or folded from a bottom plate of the container, and the fixing pin device may be formed on the bottom plate of the container to be inserted into the pinhole part formed at the side wall, thereby locking the side wall.

In accordance with the present disclosure, the pinhole part may be a regular trapezoidal pinhole part, and a second through-hole part formed at the bottom plate of the container may be an inverted trapezoidal through-hole part.

In accordance with the present disclosure, the pinhole part may be an inverse trapezoidal pinhole part, and a second through-hole part formed at the bottom plate of the container may be an inverted trapezoidal through-hole part.

In accordance with the present disclosure, the fixing pin device may include: a fixing pin whose at least a portion is inserted into the pinhole part; a guider formed on a side wall or bottom plate of the container and configured to guide a forward and backward sliding path of the fixing pin; and a safety member configured to maintain a forwarded state of the fixing pin such that the fixing pin inserted into the pinhole part does not come off.

In accordance with the present disclosure, the safety member may be a rotating plate rotated to interfere with a handle or stopper of the fixing pin.

In accordance with another aspect of the present disclosure, provided is a container, including: a bottom plate; a side wall configured to rotate about a hinge axis to be expanded or folded from the bottom plate; movable posts adjusted in height by expanding and contracting from the side wall; and a container locking apparatus installed on the side wall and the movable posts or on the bottom plate and the side wall, wherein the container locking apparatus includes: at least one pinhole part formed at a portion of a container; and a fixing pin device formed at another portion of the container to correspond to the pinhole part, and slidably formed such that at least a portion of the fixing pin device can be inserted into the pinhole part to lock a portion of the container, wherein the pinhole part includes a regular trapezoidal pinhole part with an overall positive trapezoidal shape or an inverse trapezoidal pinhole part with an overall negative trapezoidal shape which guides the fixing pin device to be easily inserted when insertion of the fixing pin device begins, and makes the fixing pin device to firmly fix the pinhole part when insertion of the fixing pin device is completed.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE DISCLOSURE

Figure 1:
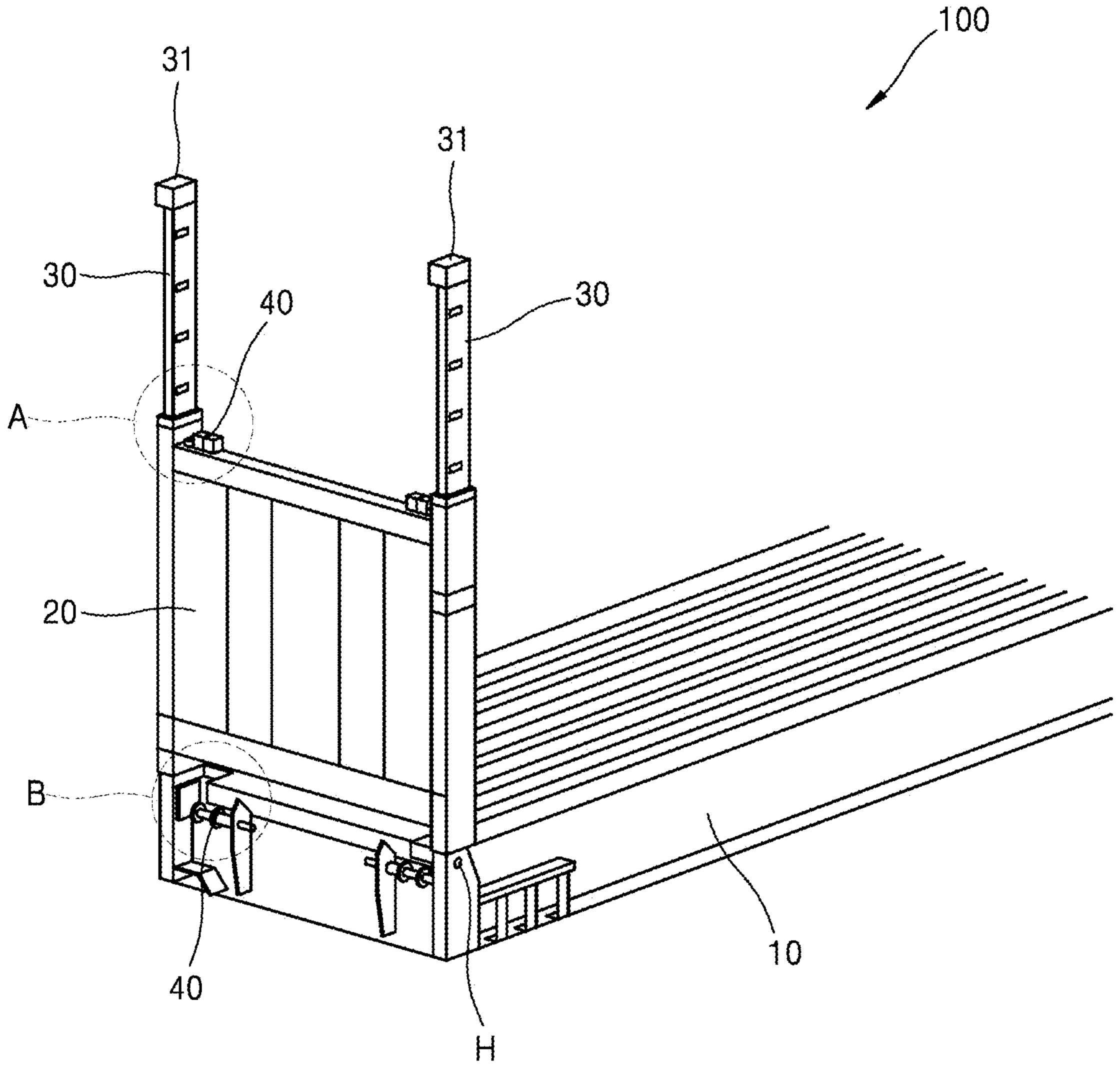
FIG. 1 illustrates a perspective view of a container locking apparatus and container according to some embodiments of the present disclosure.

Hereinafter, one or more preferred embodiments of the present disclosure will be described in detail with reference to the accompanying drawings.

Embodiments of the present disclosure are provided to more completely explain the present disclosure to those skilled in the art, and the following embodiments may be modified in many different forms, but the scope of the present disclosure is not limited to the following embodiments. Rather, the embodiments are provided to make the disclosure thorough and complete and to fully convey the technical idea of the disclosure to those skilled in the art. In the drawings, the thicknesses and sizes of layers may be exaggerated for convenience and clarity of explanation.

It will be understood that when an element, such as a layer, a region, or a substrate, is referred to as being "on," "connected to," "stacked on" or "coupled to" another element, it may be directly on, connected to, stacked on, or coupled to the other element or intervening elements may be present. In contrast, when an element is referred to as being "directly on," "directly connected to" or "directly coupled to" another element or layer, there are no intervening elements or layers present. Like reference numerals refer to like elements throughout. As used herein, the term "and/or" includes any and all combinations of one or more of the associated listed items.

It will be understood that, although the terms first, second, etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present disclosure.

Spatially relative terms, such as "above," "upper," "beneath," "below," "lower," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "above" may encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the inventive concept. As used herein, the singular forms "a," "an" and "the" are intended to include the plural forms as well, unless the context clearly indicates otherwise. It will be further understood that the terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Embodiments of the disclosure are described herein with reference to drawings that schematically illustrate idealized embodiments of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

FIG. 1 illustrates a perspective view of a container locking apparatus 40 and container 100 according to some embodiments of the present disclosure.

As shown in FIG. 1, the container 100 according to some embodiments of the present disclosure may include a bottom plate 10 forming the bottom of a container so that various cargoes can be loaded inside the container and transported to a ship, an aircraft, etc.; at least one side wall 20 configured to rotate about the hinge axis H and to be expanded or folded from the bottom plate 10; movable posts 30 configured to be adjusted in height by expanding and contracting from the side wall 20; and a container locking apparatus 40 installed on part A, i.e., the side wall 20 and the movable posts 30, or part B, i.e., the bottom plate 10 and the side wall 20.

Here, a corner cast 31 may be formed at an upper end of each of the movable posts 30 and may be fastened to container lifting equipment, and, among the at least one side wall 20, two side walls 20 may be respectively installed at front and rear ends of the bottom plate 10, a total of four side walls 20 may be respectively installed at the front, rear, left, and right ends, or the number of the side walls 20 to be installed may be various.

However, the container locking apparatus 40 of the present disclosure is not limited to be installed at the above-described container 100 having the foldable side wall 20 or the movable posts 30, and may be applied to any locking apparatuses of general containers or other special containers.

Figure 2:
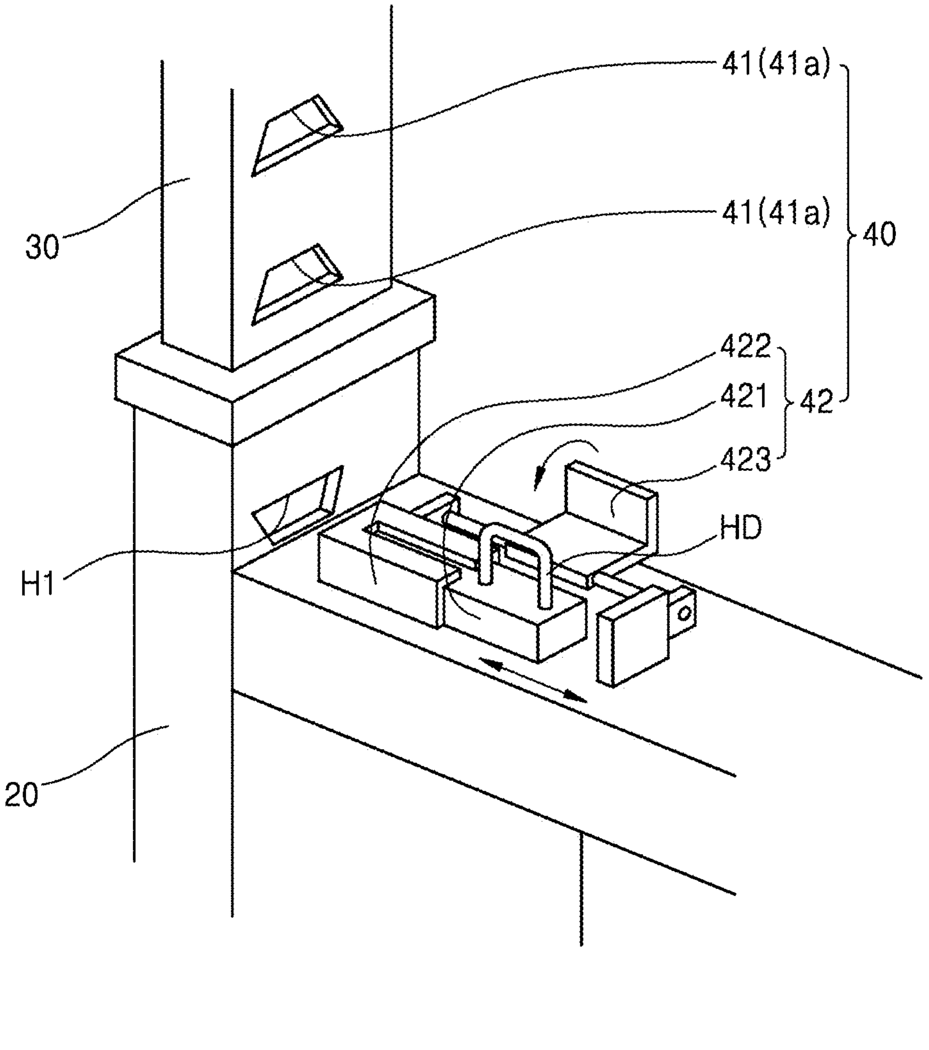
FIG. 2 illustrates an enlarged perspective view of part A of the container of FIG. 1.
Figure 3:
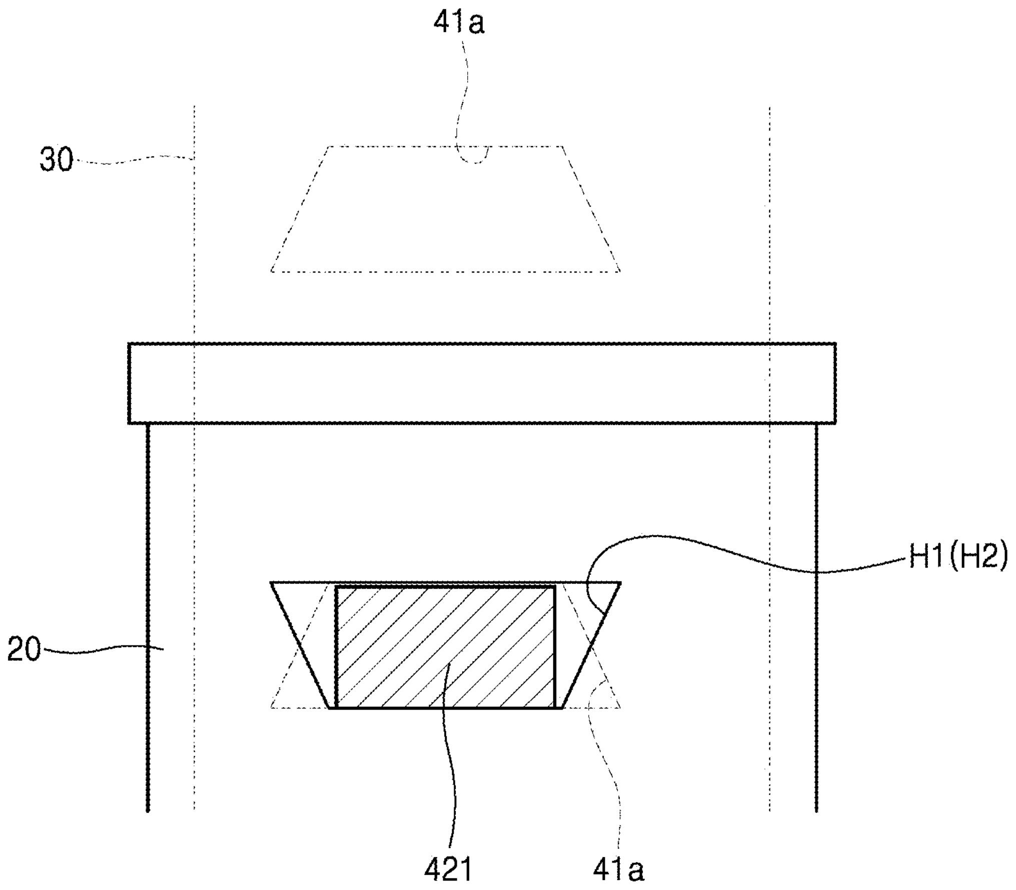
FIG. 3 illustrates a sectional side view of an embodiment of the container locking apparatus of FIG. 2.

FIG. 2 illustrates an enlarged perspective view of part A of the container 100 of FIG. 1, and FIG. 3 illustrates a sectional side view of an embodiment of the container locking apparatus 40 of FIG. 2.

As shown in FIGS. 1 to 3, the container locking apparatus 40 may include, for example, a pinhole part 41 formed at a portion of the container 100; and a fixing pin device 42 which is formed at another part of the container 100 to correspond to the pinhole part 41 and whose at least a portion is slidably inserted into the pinhole part 41 so that a portion of the container 100 is locked.

As a more particular example, the pinhole part 41 may include a regular trapezoidal pinhole part with an overall positive trapezoidal shape or an inverse trapezoidal pinhole part with an overall negative trapezoidal shape which guides the fixing pin device 42 to be easily inserted when insertion of the fixing pin device 42 begins and makes the fixing pin device 42 to firmly fix the pinhole part 41 when the insertion of the fixing pin device 42 is completed.

For example, a plurality of pinhole parts 41 may be formed on a side surface of each of the movable posts 30 configured to be adjusted in height by expanding and contracting from the side wall 20 of the container 100, and the fixing pin device 42 may be formed on the side wall 20 of the container 100 to be inserted into one of the pinhole parts 41 formed on the movable post 30 to lock the movable post 30, as shown in FIGS. 2 and 3.

As a more particular example, the pinhole parts 41 may be a regular trapezoidal pinhole part 41*a* having a narrow top and a wide bottom, and a first through-hole part H1 formed on the side wall 20 of the container 100 may be an inverted trapezoidal through-hole part having a wide top and a narrow bottom, as shown in FIGS. 2 and 3.

Accordingly, when the insertion of the fixing pin device 42 begins, a fixing pin 421 with a square cross-section of the fixing pin device 42 is first guided to a wide upper portion of the first through-hole part H1 while being guided by a wide lower portion of the regular trapezoidal pinhole part 41*a*, as shown in FIG. 3, so that the fixing pin 421 may be inserted very easily and loosely.

Next, when the insertion of the fixing pin device 42 is completed, the fixing pin 421 with a square cross-section of the fixing pin device 42 is first guided to a narrow lower part of the first through-hole part H1 while being guided by a narrow upper part of the regular trapezoidal pinhole part 41*a*, so that the fixing pin 421 may be fixed very firmly.

However, the shapes of the pinhole part and first through-hole part are not limited to the shapes shown in the drawings, and various combinations of a pinhole part and a through-hole part may be applied.

Therefore, the present disclosure can loosely guide the fixing pin 421 to be easily inserted when it is initially inserted, thereby improving usability, and can firmly fix the fixing pin 421 to the pinhole part 41 when it is fully inserted, thereby greatly improving the fixing force.

Figure 4:
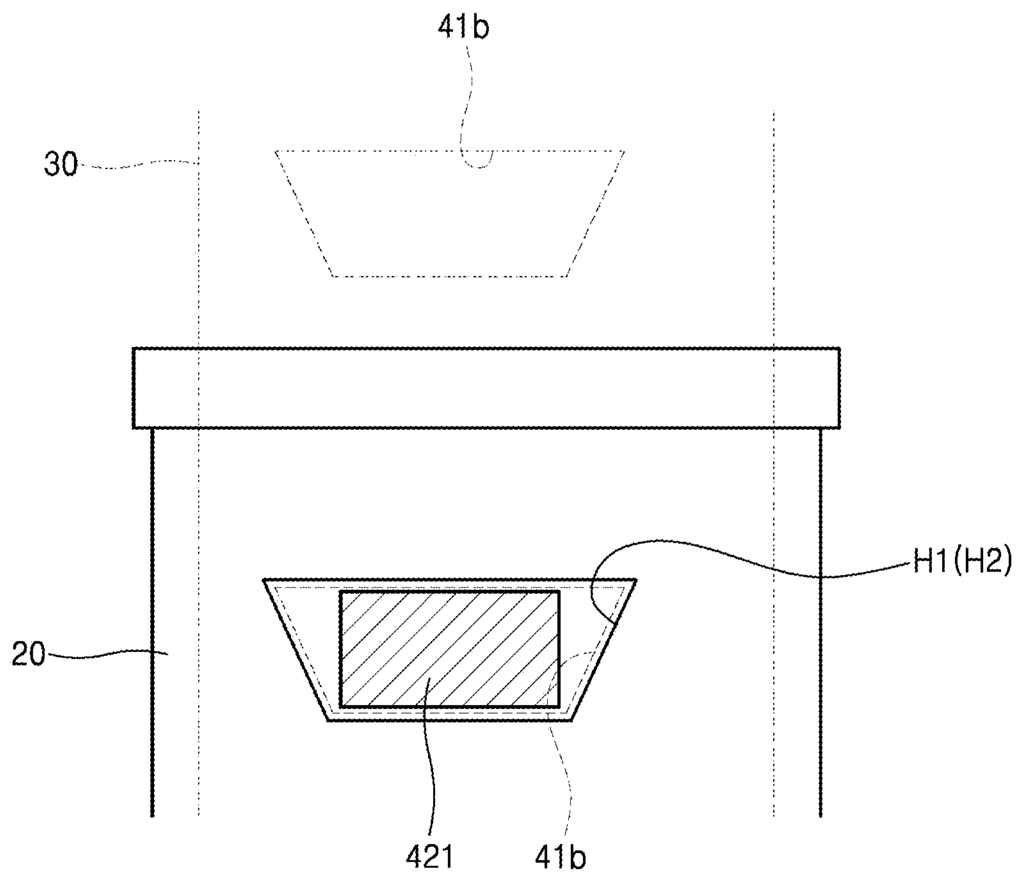
FIG. 4 illustrates a sectional side view of another embodiment of the container locking apparatus of FIG. 2.

FIG. 4 illustrates a sectional side view of another embodiment of the container locking apparatus 40 of FIG. 2.

As another embodiment of the container locking apparatus 40 of according to some embodiments of the present disclosure, the pinhole part 41 may be an inverse trapezoidal pinhole part 41*b*, and the first through-hole part H1 formed on the side wall 20 of the container 100 may be an inverted trapezoidal through-hole part, as shown in FIG. 4.

Accordingly, when the insertion of the fixing pin device 42 begins, a fixing pin 421 with a square cross-section of the fixing pin device 42 is first guided to a wide upper portion of the first through-hole part H1 while being guided by a wide upper portion of the inverse trapezoidal pinhole part 41*b*, as shown in FIG. 4, so that the fixing pin 421 may be inserted very easily and loosely.

Next, when the insertion of the fixing pin device 42 is completed, the fixing pin 421 with a square cross-section of the fixing pin device 42 is first guided to a narrow lower part of the first through-hole part H1 while being guided by a narrow lower part of the inverse trapezoidal pinhole part 41*b*, so that the fixing pin 421 may be fixed very firmly.

Therefore, the present disclosure can loosely guide the fixing pin 421 to be easily inserted when it is initially inserted, thereby improving usability, and can firmly fix the fixing pin 421 to the pinhole part 41 when it is fully inserted, thereby greatly improving the fixing force.

Figure 5:
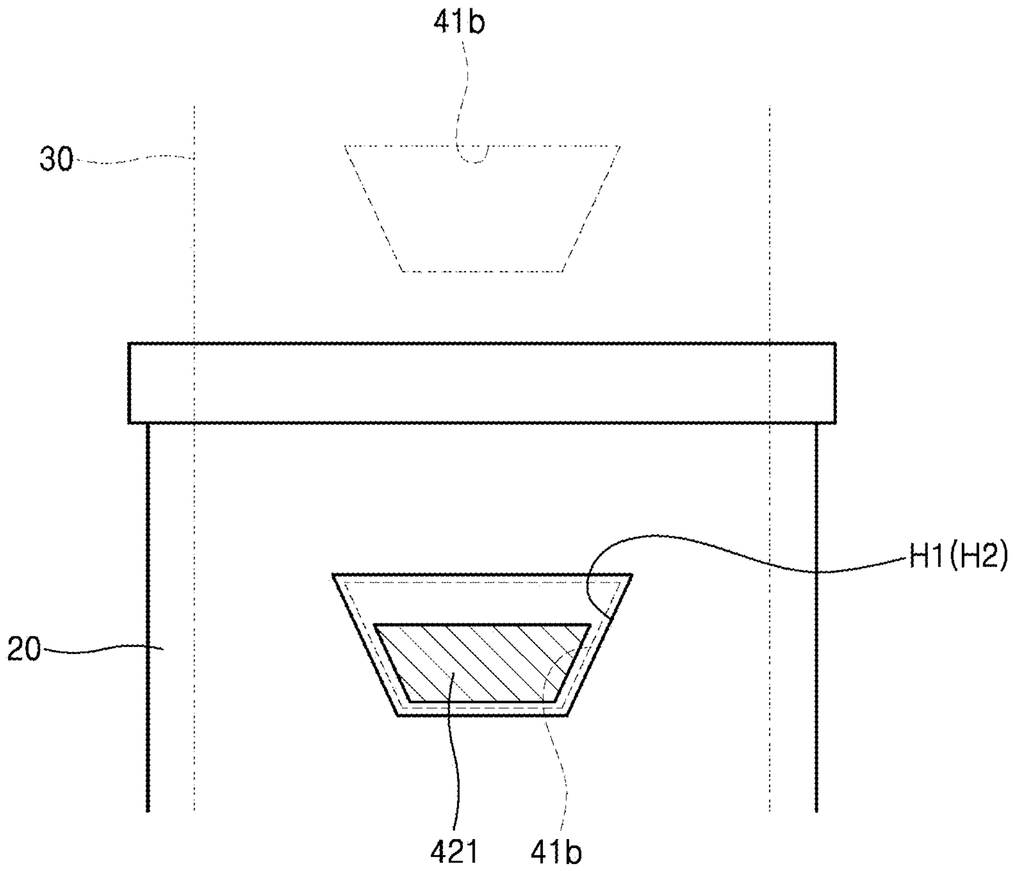
FIG. 5 illustrates a sectional side view of still another embodiment of the container locking apparatus of FIG. 2.
Figure 6:
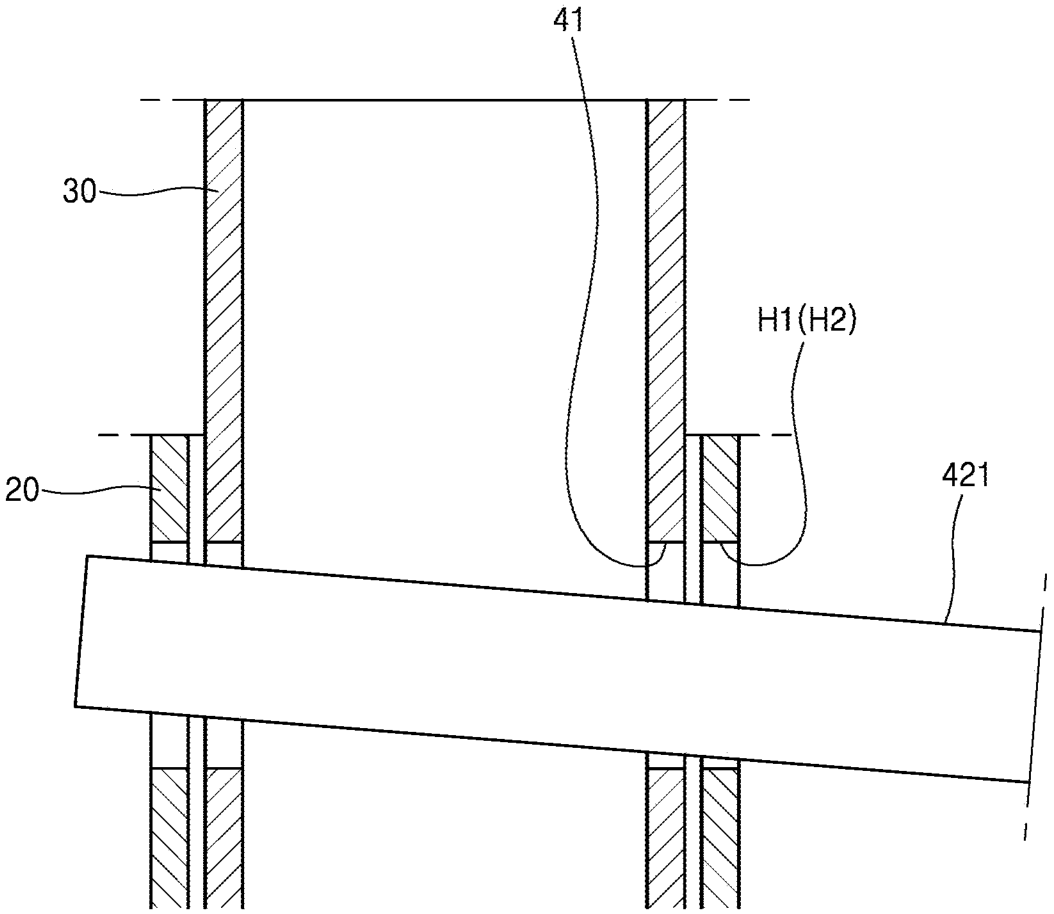
FIGS. 6 and 7 are cross-sectional views illustrating an insertion process of the container locking apparatus of FIG. 2.
Figure 7:
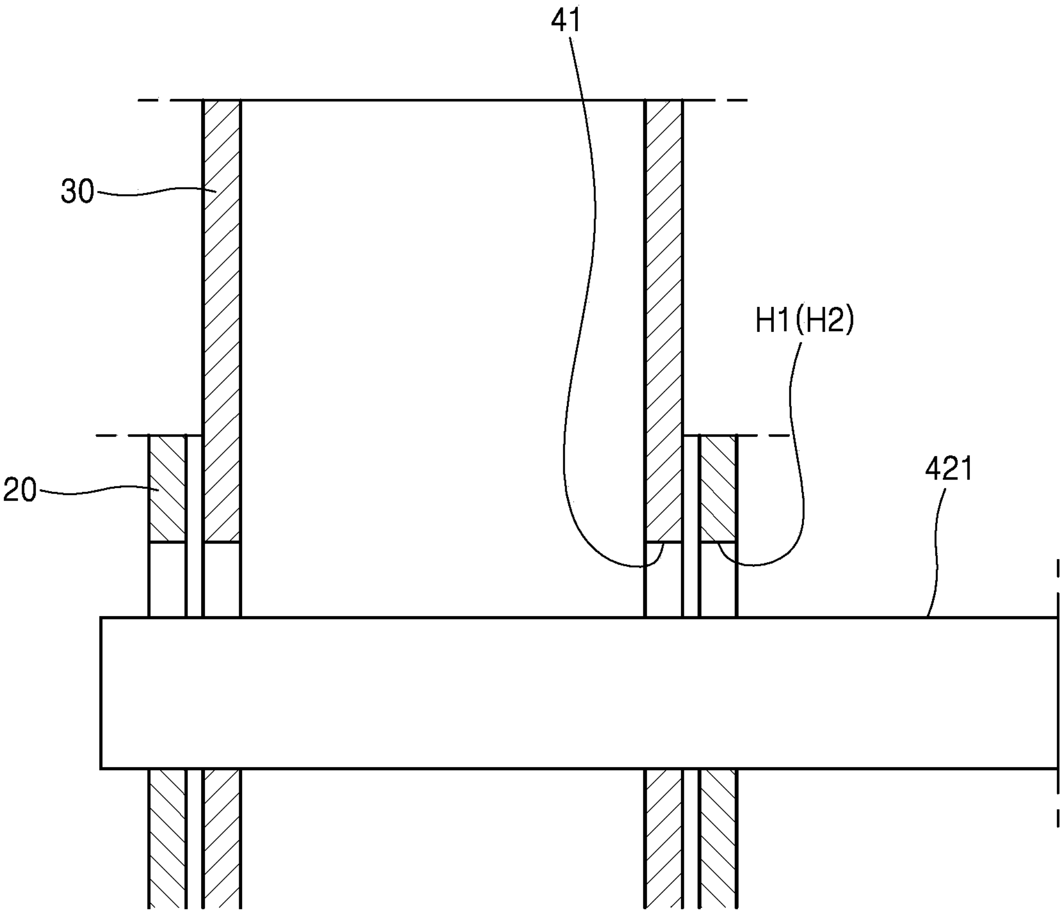

FIG. 5 illustrates a sectional side view of still another embodiment of the container locking apparatus 40 of FIG. 2, and FIGS. 6 and 7 are cross-sectional views illustrating an insertion process of the container locking apparatus 40 of FIG. 2.

As still another embodiment of the container locking apparatus 40 according to some embodiments of the present disclosure, the pinhole part 41 may be an inverse trapezoidal pinhole part 41*b*, the first through-hole part H1 formed on the side wall 20 of the container 100 may be an inverted trapezoidal through-hole part, and the fixing pin 421 of the fixing pin device 42 may be inserted into the inverse trapezoidal pinhole part 41*b* and the first through-hole part H1 while having a space in the up-down direction, as shown in FIG. 5.

Accordingly, when the insertion of the fixing pin device 42 begins, a fixing pin 421 with a square cross-section of the fixing pin device 42 is first guided to a wide upper portion of the first through-hole part H1 while being guided by a wide upper portion of the inverse trapezoidal pinhole part 41*b*, as shown in FIG. 6, so that the fixing pin 421 may be inserted very easily and loosely while being guided with plenty of space in the up-down direction.

Next, when the insertion of the fixing pin device 42 is completed, the fixing pin 421 with a square cross-section of the fixing pin device 42 is first guided to a narrow lower part of the first through-hole part H1 while being guided by a narrow lower part of the inverse trapezoidal pinhole part 41*b* as shown in FIG. 7, so that it is very firmly fixed and may be firmly guided in the up-down direction as well.

Figure 8:
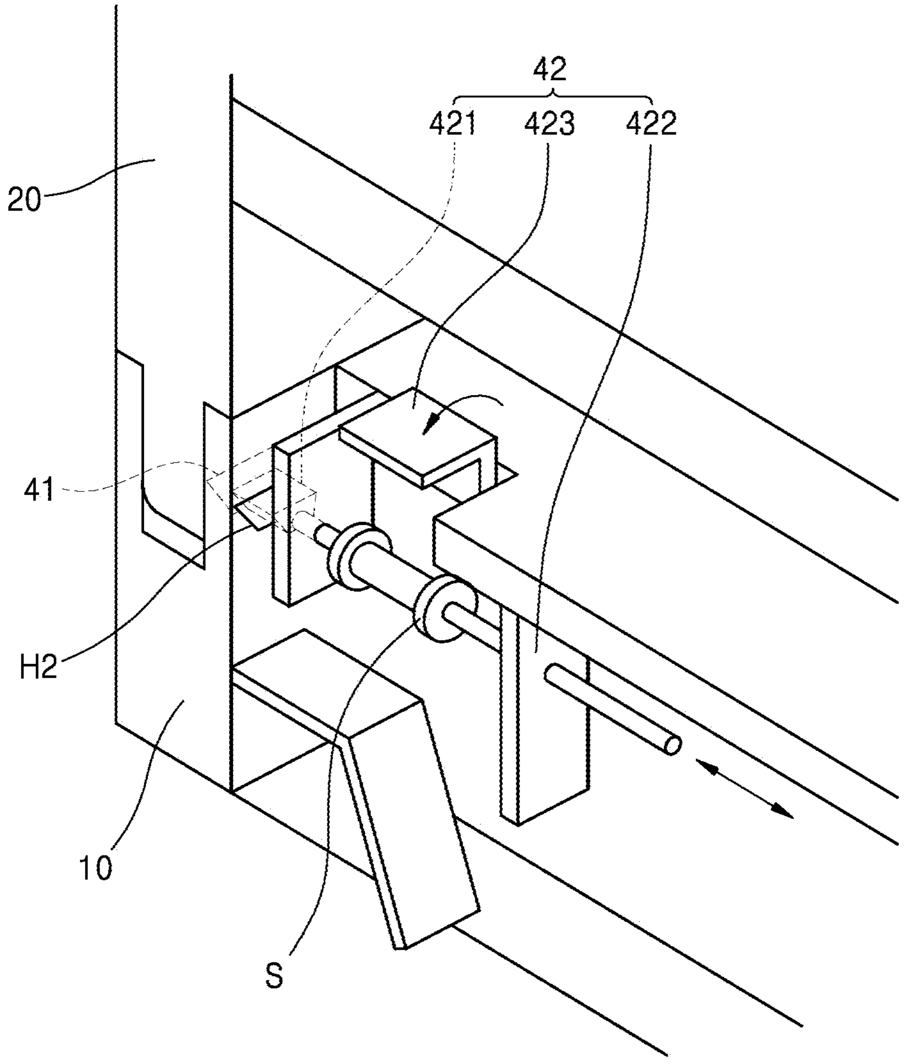
FIG. 8 illustrates an enlarged perspective view of part B of the container of FIG. 1.

FIG. 8 illustrates an enlarged perspective view of part B of the container 100 of FIG. 1.

As shown in FIG. 8, the container locking apparatus 40 according to some embodiments of the present disclosure includes at least one pinhole part 41, and the pinhole part 41 is formed on the side wall 20 that rotates about the hinge axis H to be expanded or folded from the bottom plate 10 of the container 100. In addition, the fixing pin device 42 may be formed on the bottom plate 10 of the container 100 such that it can be inserted into the pinhole part 41 formed on the side wall 20 to lock the side wall 20.

Here, the pinhole part 41 of FIG. 8 may be a regular trapezoidal pinhole part 41*a*, and may also be a second through-hole part H2 formed on the bottom plate 10 of the container 100, as in FIG. 3.

In addition, the pinhole part 41 of FIG. 8 may be an inverse trapezoidal pinhole part 41*b*, and may also be a second through-hole part H2 formed on the bottom plate 10 of the container 100, as shown in FIG. 4.

Meanwhile, the fixing pin device 42 of the container locking apparatus 40 according to some embodiments of the present disclosure may include a fixing pin 421 to be inserted into at least a portion of the pinhole part 41; a guider 422 formed on the side wall 20 or bottom plate 10 of the container 100 and configured to guide a forward and backward sliding path of the fixing pin 421; and a safety member 423 configured to maintain the forwarded state of the fixing pin 421 such that the fixing pin 421 inserted into the pinhole part 41 does not come off, as shown in FIGS. 1 to 8.

Here, the safety member 423 may be a rotating plate that rotates to interfere with a handle (HD, see FIG. 2) or stopper (S, see FIG. 8) of the fixing pin 421.

Accordingly, when using the fixing pin device 42 of the container locking apparatus 40 according to some embodiments of the present disclosure, as shown in FIGS. 1 to 8, the fixing pin 421 may be inserted into the pinhole part 41 by slidably forwarding the fixing pin 421 along a forward and backward sliding path using the guider 422, and, when the fixing pin 421 is completely inserted into the pinhole part 41, the forwarded state of the fixing pin 421 may be maintained by rotating the safety member 423 to interfere with the handle (HD, see FIG. 2) or the stopper (S, see FIG. 8) of the fixing pin 421 so that the fixing pin 421 inserted into the pinhole part 41 does not come off.

However, the fixing pin device 42 of the container locking apparatus 40 is not limited to the embodiments shown in the drawings, and a wide variety of shapes and types of fixed pin devices may all be applied.

In accordance with some embodiments of the present disclosure as described above, a fixing pin is loosely guided for easy insertion when it is initially inserted, thereby improving usability, and the fixing pin is firmly fixed to a pinhole part when the insertion of the fixing pin is completed, thereby greatly improving a fixing force. It is natural that the scope of the present disclosure is not limited by these effects.

Although the present disclosure has been described with reference to embodiments shown in the drawings, the embodiments are provided as only exemplary examples, and those skilled in the art will understand that various modifications and equivalent other embodiments are possible therefrom. Therefore, the true technical protection scope of the present disclosure should be determined by the technical spirit of the appended claims.

DESCRIPTION OF SYMBOLS

10: bottom plate
20: side wall
H: hinge axis
30: movable post
31: corner cast
40: locking apparatus
41: pinhole part
41*a*: regular trapezoidal pinhole part
41*b*: inverse trapezoidal pinhole part
H1: first through-hole part
H2: second through-hole part
42: fixing pin device
421: fixing pin
422: guider
423: safety member
HD: handle
S: stopper
100: container

What is claimed is:

1. A container locking apparatus comprising:

at least one pinhole part defined on a portion of a container; and a fixing pin device disposed on another portion of the container to correspond to the at least one pinhole part, and configured to slide and insert at least a portion of the fixing pin device into the at least one pinhole part to lock a portion of the container, wherein the at least one pinhole part comprises a regular trapezoidal pinhole part having an overall positive trapezoidal shape, wherein the at least one pinhole part includes a plurality of pinhole parts, and the plurality of pinhole parts are disposed on side surfaces of movable posts configured to adjust in height by expanding and contracting from a side wall of the container, wherein the fixing pin device is disposed on the side wall of the container and configured to be inserted into one of the plurality of pinhole parts defined on the movable posts, thereby locking the movable posts, wherein a first through-hole part defined on the side wall of the container comprises an inverted trapezoidal through-hole part, wherein the regular trapezoidal pinhole part and the first through-hole part are configured to guide the fixing pin device to be easily inserted when insertion of the fixing pin device begins, and allow the fixing pin device to firmly fix the at least one pinhole part when insertion of the fixing pin device is completed.

2. The container locking apparatus according to claim 1, wherein the fixing pin device comprises:

a fixing pin, wherein at least a portion of the fixing pin is configured to be inserted into the at least one pinhole part;

a guider disposed on a side wall or bottom plate of the container and configured to guide a forward and backward sliding path of the fixing pin; and a safety member configured to maintain a forwarded state of the fixing pin to retain the fixing pin within the at least one pinhole part.

3. The container locking apparatus according to claim 2, wherein the safety member is a rotating plate configured to rotate and interfere with a handle or stopper of the fixing pin.

4. The container locking apparatus according to claim 1, wherein the regular trapezoidal pinhole part has a narrow upper portion and a wide lower portion, and the inverted trapezoidal through-hole part has a wide upper portion and a narrow lower portion.

5. The container locking apparatus according to claim 2, wherein the fixing pin has a square cross-section and is configured to be loosely guided by wide portions of the regular trapezoidal pinhole part and the inverted trapezoidal through-hole part when the insertion begins and be firmly engaged with narrow portions of the regular trapezoidal pinhole part and the inverted trapezoidal through-hole part when the insertion is completed.

6. A container locking apparatus, comprising:

at least one pinhole part defined on a portion of a container; and a fixing pin device disposed on another portion of the container to correspond to the at least one pinhole part, and configured to slide and insert at least a portion of the fixing pin device into the at least one pinhole part to lock a portion of the container, wherein the at least one pinhole part comprises a regular trapezoidal pinhole part having an overall positive trapezoidal shape, wherein the at least one pinhole part is defined on a side wall configured to rotate about a hinge axis to be expanded or folded from a bottom plate of the container, wherein the fixing pin device is disposed on the bottom plate of the container to be inserted into the at least one pinhole part formed at the side wall, thereby locking the side wall, wherein a second through-hole part defined on the bottom plate of the container is an inverted trapezoidal through-hole part, and wherein the regular trapezoidal pinhole part and the inverted trapezoidal through-hole part are configured to guide the fixing pin device to be easily inserted when insertion of the fixing pin device begins, and allow the fixing pin device to firmly fix the at least one pinhole part when insertion of the fixing pin device is completed.

7. The container locking apparatus according to claim 6, wherein the fixing pin device comprises:

a fixing pin, wherein at least a portion of the fixing pin is configured to be inserted into the at least one pinhole part;

a guider disposed on a side wall or bottom plate of the container and configured to guide a forward and backward sliding path of the fixing pin; and a safety member configured to maintain a forwarded state of the fixing pin to retain the fixing pin within the at least one pinhole part.

8. The container locking apparatus according to claim 7, wherein the safety member is a rotating plate rotated to interfere with a handle or stopper of the fixing pin.

9. The container locking apparatus according to claim 6, wherein the regular trapezoidal pinhole part has a narrow upper portion and a wide lower portion, and the inverted trapezoidal through-hole part has a wide upper portion and a narrow lower portion.

10. The container locking apparatus according to claim 7, wherein the fixing pin has a square cross-section and is configured to be loosely guided by wide portions of the regular trapezoidal pinhole part and the inverted trapezoidal through-hole part when the insertion begins and be firmly engaged with narrow portions of the regular trapezoidal pinhole part and the inverted trapezoidal through-hole part when the insertion is completed.

* * * * *